(12) United States Patent
Ingegneri

(10) Patent No.: US 10,649,790 B1
(45) Date of Patent: May 12, 2020

(54) MULTITHREADED RENDERING FOR VIRTUALIZED GRAPHICS PROCESSING

(71) Applicant: Amazon Technologies, Inc., Seattle, WA (US)

(72) Inventor: Gianpaolo Ingegneri, Messina (IT)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/686,085

(22) Filed: Aug. 24, 2017

(51) Int. Cl.
*G06F 9/4401* (2018.01)
*G09G 5/36* (2006.01)
*G06T 15/00* (2011.01)

(52) U.S. Cl.
CPC ........... *G06F 9/4405* (2013.01); *G09G 5/363* (2013.01); *G06T 15/005* (2013.01)

(58) Field of Classification Search
None
See application file for complete search history.

(56) References Cited

U.S. PATENT DOCUMENTS

| 9,069,622 | B2 | 6/2015 | Post et al. | |
|---|---|---|---|---|
| 9,098,323 | B2 | 8/2015 | Mitra et al. | |
| 10,074,206 | B1 | 9/2018 | Ingegneri | |
| 2012/0110535 | A1* | 5/2012 | Iwahashi | H01L 27/0207 716/122 |
| 2014/0055466 | A1 | 2/2014 | Petrov et al. | |
| 2014/0176583 | A1 | 6/2014 | Abiezzi et al. | |
| 2015/0116335 | A1 | 4/2015 | Chen et al. | |
| 2015/0220354 | A1 | 8/2015 | Nair | |
| 2015/0370589 | A1* | 12/2015 | Bidarkar | G06F 9/45558 718/1 |
| 2016/0239333 | A1* | 8/2016 | Cowperthwaite | G06F 9/45558 |

OTHER PUBLICATIONS

Federico Silla, "The rCUDA technology: an inexpensive way to improve the performance of GPU-based clusters." Talk at Computer Engineering Laboratory, Delft University of Technology. Delft, Netherlands. Apr. 2015, pp. 1-57.

(Continued)

*Primary Examiner* — Michelle Chin
(74) *Attorney, Agent, or Firm* — Robert C. Kowert; Meyertons, Hood, Kivlin, Kowert & Goetzel, P.C.

(57) ABSTRACT

Methods, systems, and computer-readable media for multi-threaded rendering for virtualized graphics processing are disclosed. Commands for a GPU are generated by application threads executing in parallel on a computing device. A virtual GPU is implemented using a physical GPU in a GPU server and attached to the computing device over a network. The GPU server receives the commands from the computing device via the network. Individual commands are associated with identifiers of individual application threads. Based at least in part on the identifiers, the individual commands are assigned to individual execution threads on the GPU server. The individual execution threads correspond to individual application threads. GPU output is generated based at least in part on parallel execution of the commands using the execution threads.

20 Claims, 14 Drawing Sheets

(56) References Cited

OTHER PUBLICATIONS

Antonio J. Peña, et al., "A complete and efficient CUDA-sharing solution for HPC clusters." In Parallel Computing Journal, vol. 40, Issue 10, Dec. 2014. http://www.sciencedirect.com/science/article/pii/S0167819114001227, pp. 574-588.
"NICE DCV Administration Guide," version 2014.0, Nice S.R.L, Asti, Italy, Jul. 2015. Source: https://www.nice-software.com/download/nice-dcv-2014#documentation, pp. 1-96.
U.S. Appl. No. 14/822,511, filed Aug. 10, 2015, Nicholas Patrick Wilt et al.
U.S. Appl. No. 15/249,150, filed Aug. 26, 2016, Gianpaolo Ingegneri.

* cited by examiner

MULTITHREADED RENDERING FOR VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
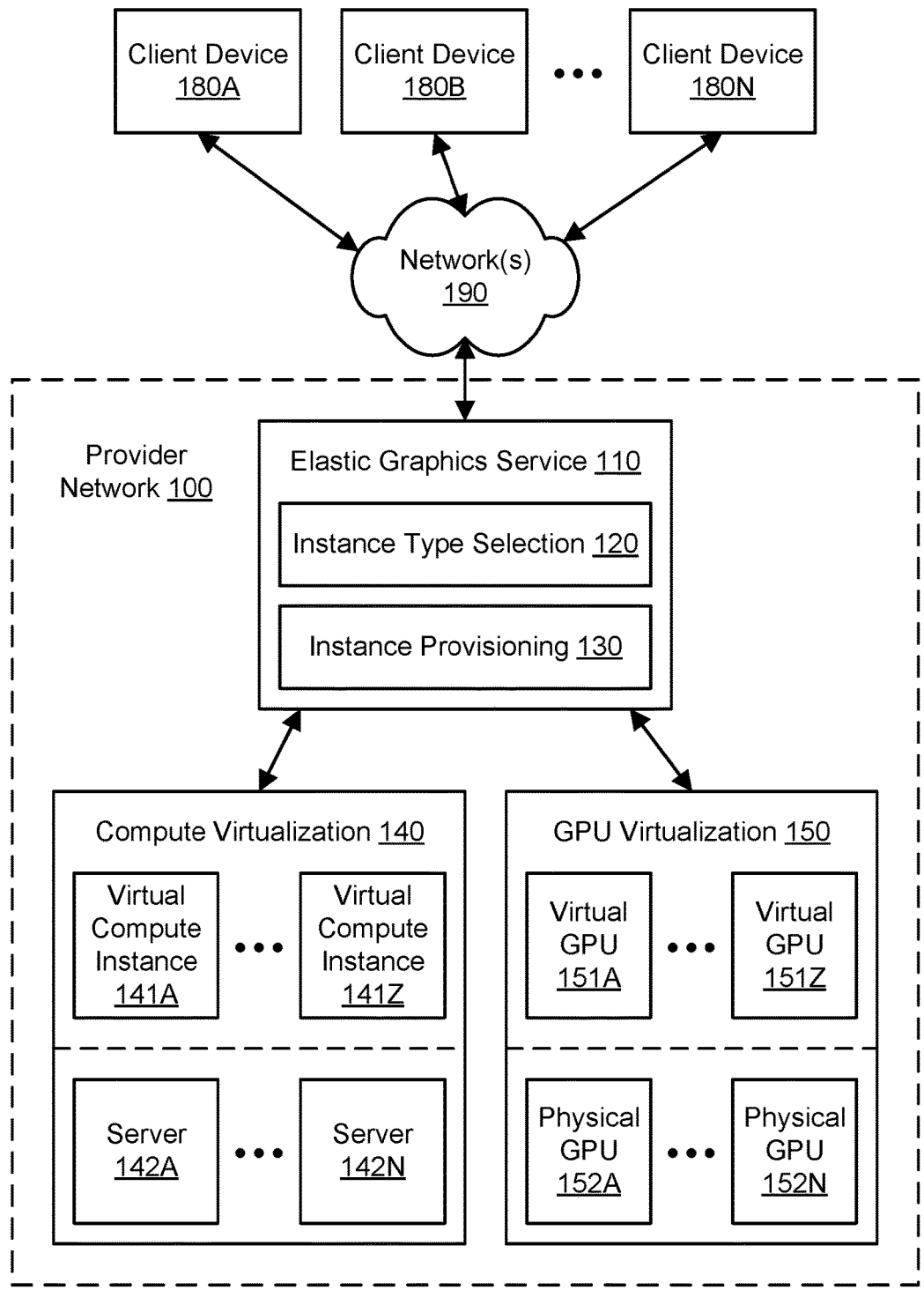
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for multithreaded rendering for virtualized graphics processing are described. Using the techniques described herein, a computing device may be provisioned, and a virtual graphics processing unit (GPU) may be attached to the computing device to provide virtualized graphics processing over a network connection. The virtual GPU may be implemented in a GPU server, and the computing device may implement a virtual compute instance. The computing device, also referred to as an application host, may be configured to execute one or more applications that seek to use the virtualized graphics processing provided by the virtual GPU. The one or more applications may include a plurality of application threads that execute in parallel. The various application threads may generate and send commands (e.g., graphics commands) to the GPU server over the network for execution using the virtual GPU. Instead of executing the commands using a single thread on the GPU server, the GPU server may launch a plurality of execution threads. In one embodiment, the execution threads may correspond to the application threads, e.g., with a one-to-one correspondence. When the compute instance collects and sends commands (and associated data) to the GPU server, a command (and its data) may be associated with a thread identifier for the application thread that generated the command. Upon receipt by the GPU server, a command (and its data) may be assigned to an execution thread that corresponds to the application thread based (at least in part) on the thread identifier. An execution thread may be launched on receipt of the first command sent by a corresponding application thread. The execution threads may execute in parallel on the GPU server, and the commands may be executed on the virtual GPU to generate output. In one embodiment, an application thread may issue a blocking call, and the thread may block until a response is received from the GPU server to a query message sent by the compute instance. In one embodiment, a different network connection may be used for the query messages and responses than for the commands and data. In one embodiment, multiple network connections or data slices may be used for sending the commands and data. Using these techniques, parallelism on the application host may be maintained on the GPU server that implements the virtual GPU.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of servers 142A-142N, also referred to as physical compute instances. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying servers 142A-142N may be heterogeneous, and the underlying physical GPUs 152A-152N may be heterogeneous as well. In one embodiment, the compute virtualization 140 may use techniques for multi-tenancy to provision virtual compute instances 141A-141Z that exceed the servers 142A-142N in number. In one embodiment, the GPU virtualization 150 may use techniques for multi-tenancy to provision virtual GPUs 151A-151Z that exceed the physical GPUs 152A-152N in number.

The elastic graphics service 110 may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying server for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 12), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner. The provider network 100 may thus represent a multi-tenant provider network.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 12.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 12:
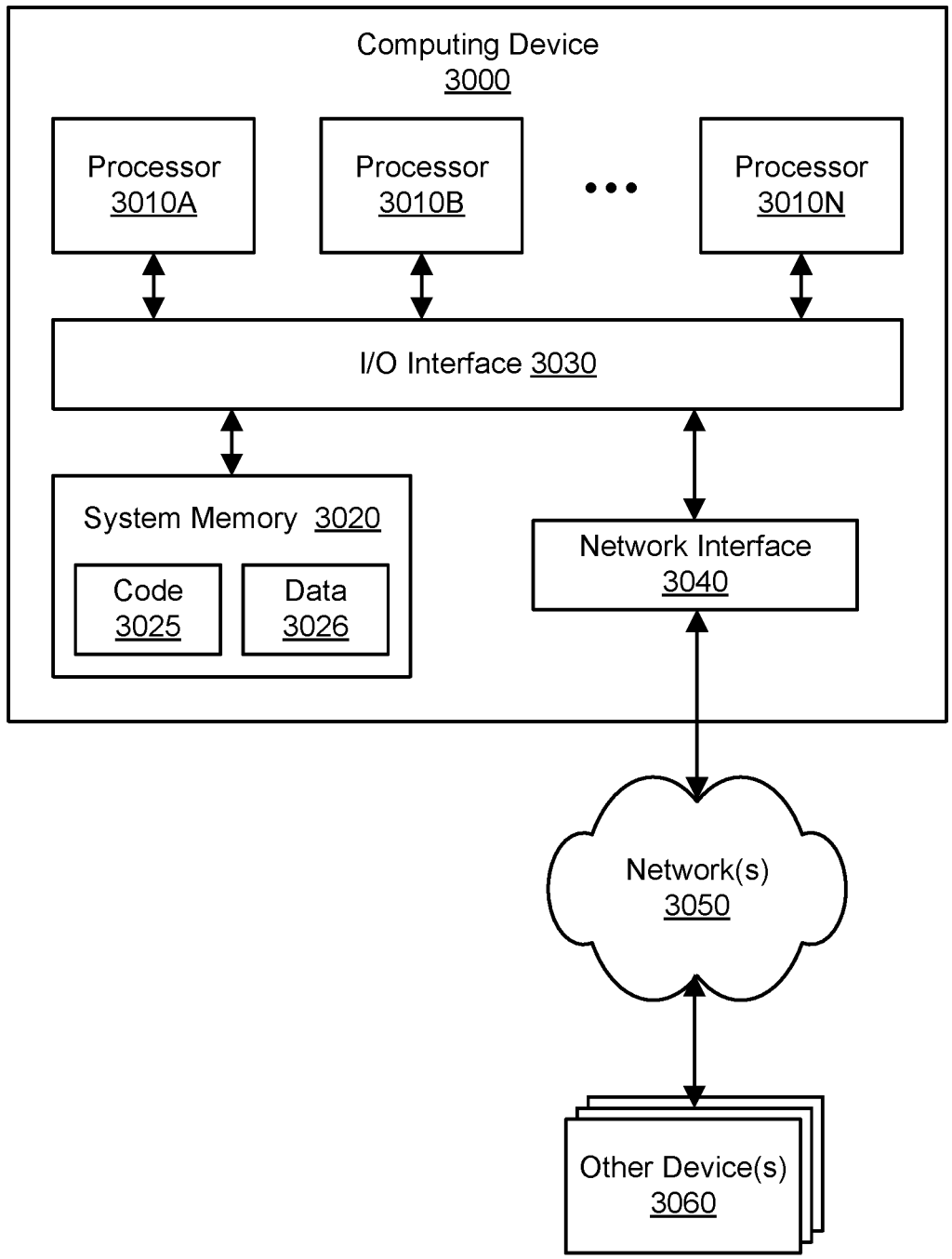
FIG. 12 illustrates an example computing device that may be used in some embodiments.

The provider network 100 may include a plurality of computing devices, any of which may be implemented by the example computing device 3000 illustrated in FIG. 12. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although servers 142A through 142N are shown for purposes of example and illustration, it is contemplated that different quantities and configurations of servers may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
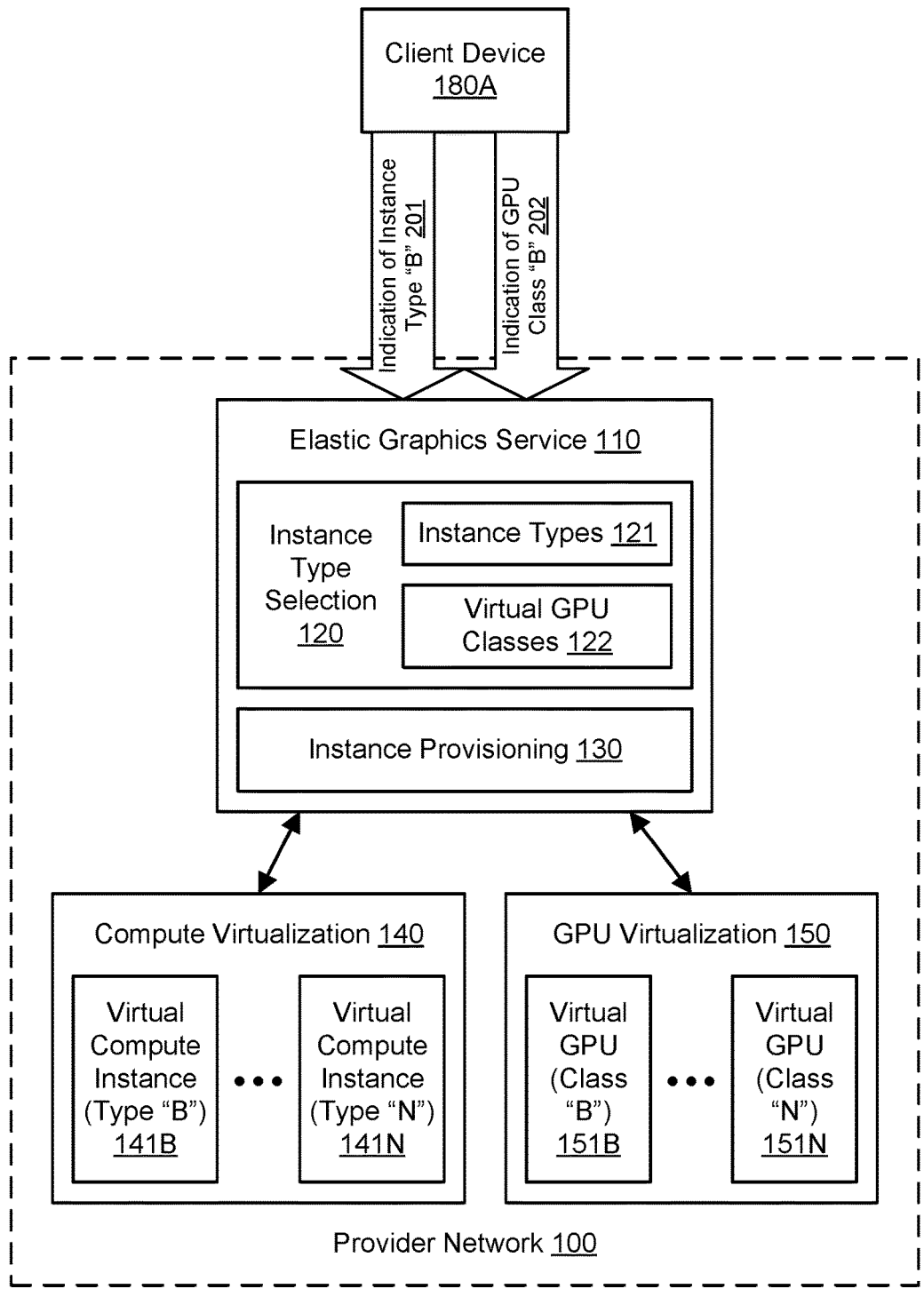
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
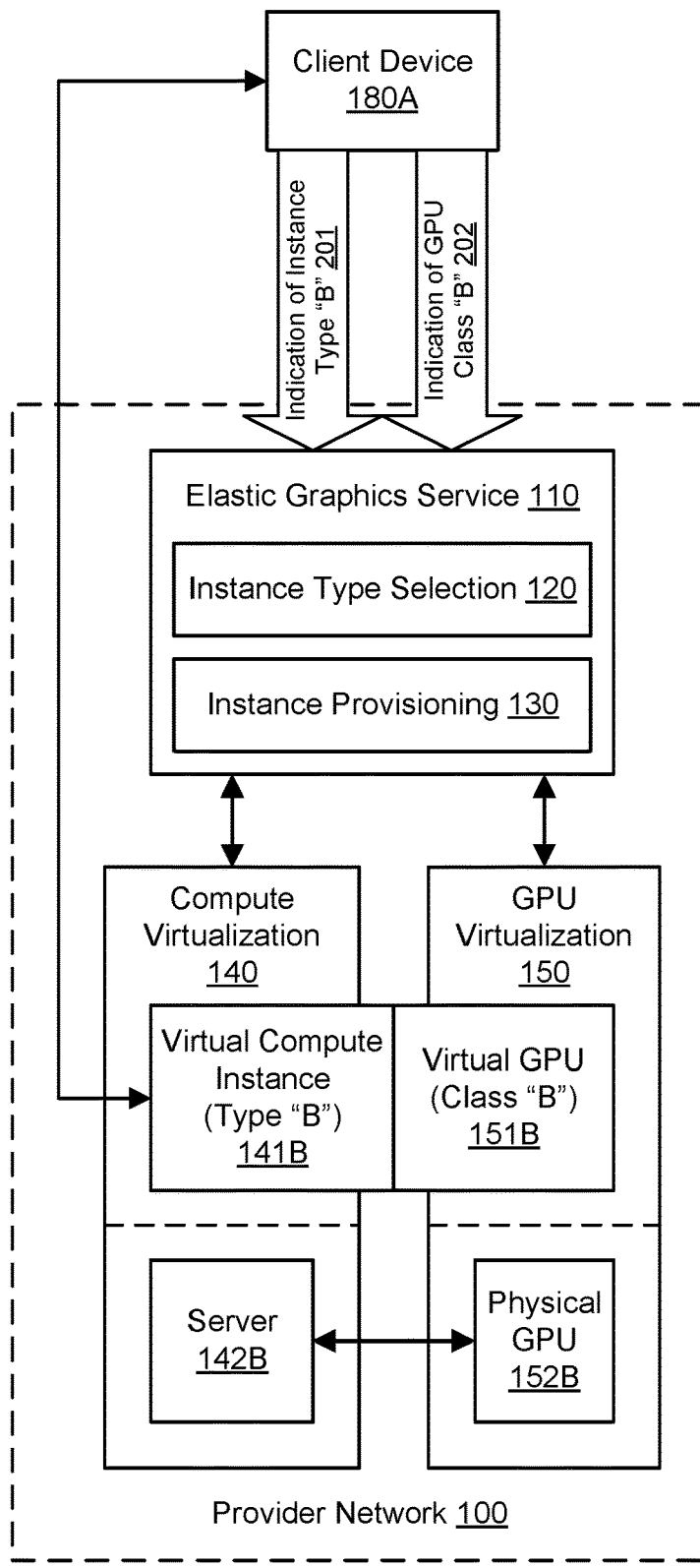
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a server 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying server for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a server 142B may communicate with a physical GPU 152B, e.g., over a network. The physical GPU 152B may be located in a different computing device than the server 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
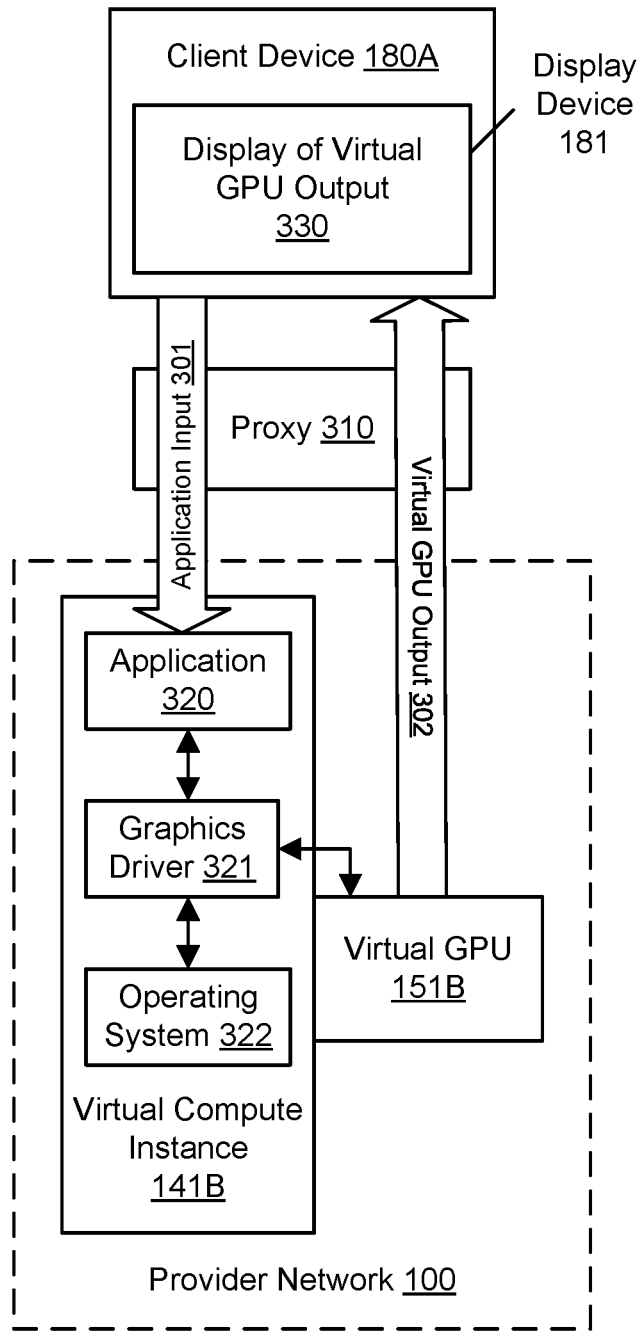
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying server 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose GPU computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
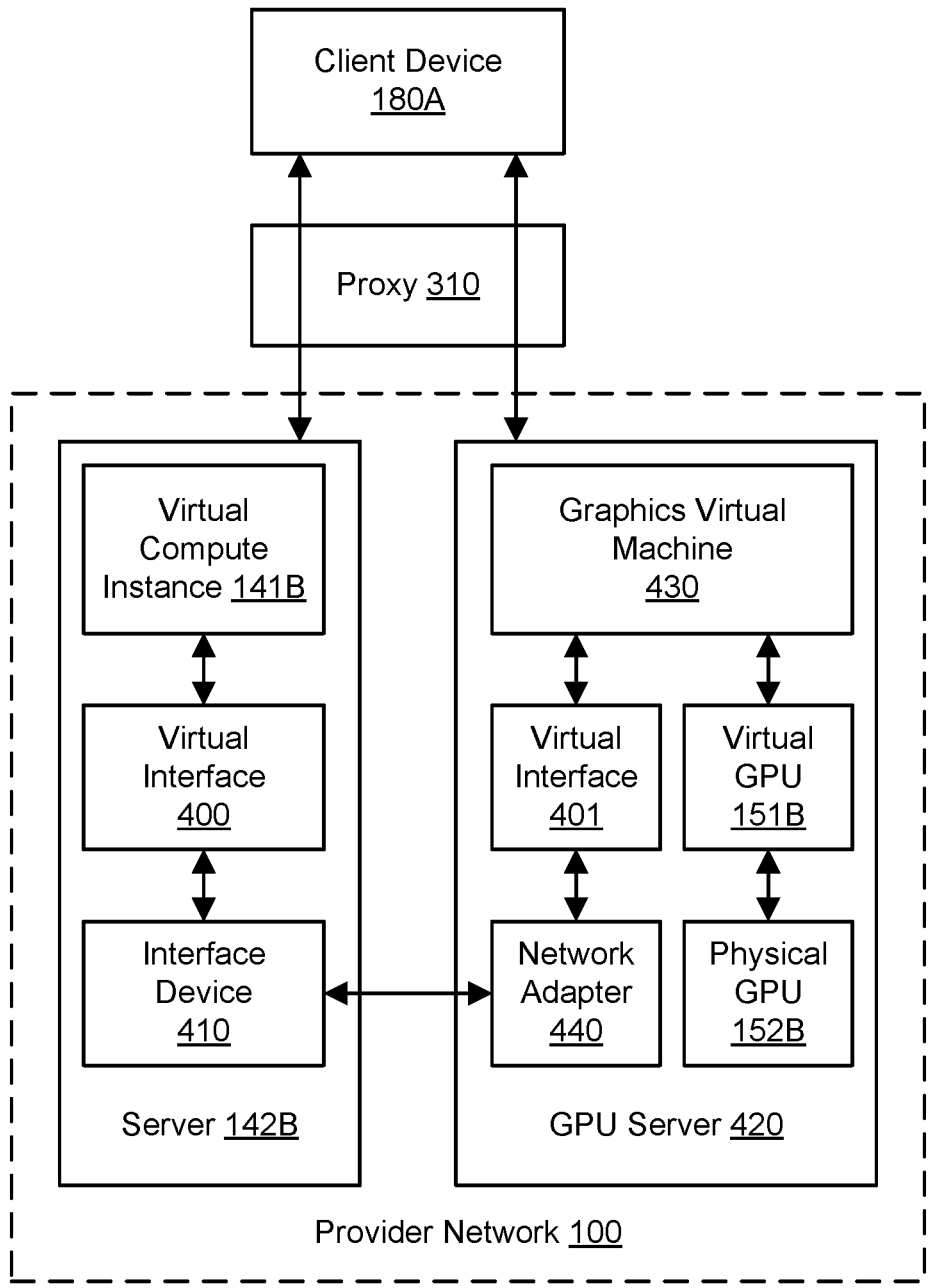
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a server 142B, and the virtual GPU 151B attached to that instance 141B may be implemented using a separate and distinct computing device termed a GPU server 420, also referred to as a graphics server or graphics appliance. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the GPU server 420 (and thus with the physical GPU 152B) over a network. The interface device 410 may be implemented in any suitable manner, e.g., as an expansion card (such as a PCI Express card) or attached peripheral device for the server 142B. The interface device 410 may use single root I/O virtualization to expose hardware virtual functions to the virtual compute instance 141B. In one embodiment, the server 142B may implement a plurality of virtual compute instances, each with its own virtual interface, and the virtual compute instances may use the interface device 410 to interact with the corresponding virtual GPUs on one or more GPU servers. The server 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the GPU server 420, and the GPU server 420 may execute the commands on behalf of the interface device. The GPU server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The GPU server 420 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the GPU server 420 may implement a plurality of virtual GPUs (such as virtual GPU 151B) using one or more physical GPUs (such as physical GPU 152B), and the virtual GPUs may interact with the corresponding virtual compute instances on one or more servers over a network. The GPU server 420 may communicate with the proxy 310 using a suitable remoting protocol, e.g., to send data to and receive data from the client device 180A. For example, the GPU server 420 may generate virtual GPU output based on the commands sent from the interface device 410. The virtual GPU output may be provided to the client device 180A through the proxy 310, e.g., from the server 142B or GPU server 420.

Figure 5:
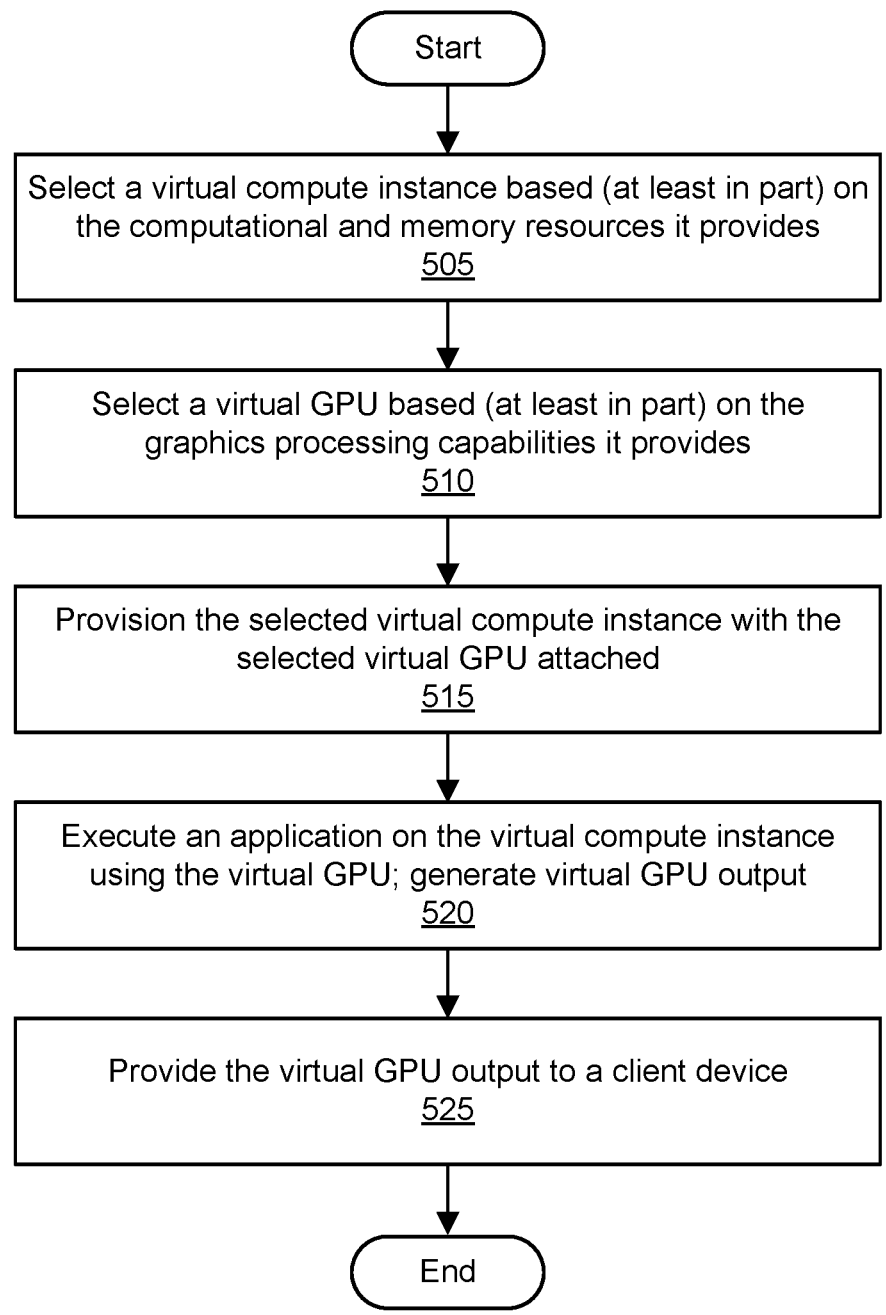
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

In some embodiments, scaling techniques may be used with the techniques for virtualized graphics processing described herein. A virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different physical compute instance may also be performed, e.g., to reduce network latency associated with virtualized graphics processing.

In some embodiments, placement optimization techniques may be used with the techniques for virtualized graphics processing described herein. Optimization of resource placement may improve one or more metrics (e.g., related to resource usage or cost) for GPU virtualization. Physical compute instance(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available physical compute instance(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying physical compute instance and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

In some embodiments, application-specific techniques may be used with the techniques for virtualized graphics processing described herein. A virtual compute instance may be provisioned and may be configured to execute an application. The application may be associated with graphics requirements. For example, an application manifest may specify a recommended graphics processing unit (GPU) class and/or size of video memory for the application, or analysis of execution of the application may determine graphics requirements for the application. A virtual GPU may be selected for the virtual compute instance based (at least in part) on the graphics requirements for the application. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. The application may be executed on the virtual compute instance using the virtual GPU. Additional applications on the virtual compute instance may use different application-specific virtual GPUs, and the application-specific virtual GPUs may vary in graphics processing capabilities based on the varying requirements of the applications.

In some embodiments, local-to-remote migration techniques may be used with the techniques for virtualized graphics processing described herein. A virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

In some embodiments, techniques for graphics library virtualization may be used with the techniques for virtualized graphics processing described herein. A virtual compute instance may be provisioned, and a virtual graphics processing unit (GPU) may be attached to the instance to provide virtualized graphics processing. One or more graphics libraries may be installed on the virtual compute instance. These local graphics libraries, such as versions of Direct3D or OpenGL, may include sets of graphics functions that are offered to applications. Some of these graphics libraries, such as Direct3D, may be specific to a particular platform (e.g., to a particular operating system family). A graphics server that includes the virtual GPU may include a driver associated with a different graphics library, such as Vulkan. The graphics library associated with the virtual GPU may represent a cross-platform graphics library that is available on a variety of computing platforms (e.g., on different families of operating systems and/or different families of computing hardware). On the virtual compute instance, an intermediate driver may translate calls associated with one or more of the local graphics libraries (such as Direct3D or OpenGL) to the equivalent calls associated with a different graphics library (such as the cross-platform Vulkan library) implemented by the graphics server. The equivalent calls may be sent over a network to the graphics server for execution using the virtual GPU, e.g., using the driver associated with the cross-platform graphics library. In this manner, the graphics server may be implemented using any platform supported by the cross-platform graphics library while providing accelerated graphics processing for an application host having one or more different (and potentially platform-specific) graphics libraries.

In some embodiments, a network-optimized graphics library may be used with the techniques for virtualized graphics processing described herein. A computing device may be provisioned, and a virtual graphics processing unit (GPU) may be attached to the computing device to provide virtualized graphics processing over a network connection. The computing device, also referred to as an application host, may be configured to execute an application using the virtualized graphics processing provided by the virtual GPU. One or more graphics libraries may be installed on the computing device. These local graphics libraries, such as versions of Direct3D or OpenGL, may include sets of graphics functions that are offered to applications. In one embodiment, the computing device includes a network-optimized graphics library, also referred to herein as an intermediate library. Calls made by an application may be made directly to the network-optimized graphics library or may be made to a different graphics library and then translated to a form associated with the network-optimized graphics library. While expressed in the form associated with the intermediate library, the calls may be serialized and sent over a network from the computing device to the GPU server in a manner that reduces network usage in comparison to other graphics libraries, such as Vulkan. The calls may be held in a command buffer prior to being sent. The GPU server that implements the virtual GPU may include a driver associated with another graphics library, e.g., Vulkan. At the GPU server, the calls received over the network may be translated to equivalent calls in this other graphics library and may then be executed using the virtual GPU. The translation may include the creation of data structures that were not passed over the network in order to conserve bandwidth. In this manner, the GPU server may be implemented using a powerful, cross-platform library such as Vulkan, the application hosts may use any suitable graphics libraries as desired by application developers, and an intermediate graphics library may translate calls between the two devices for optimized network usage.

Multithreaded Rendering

Figure 6A:
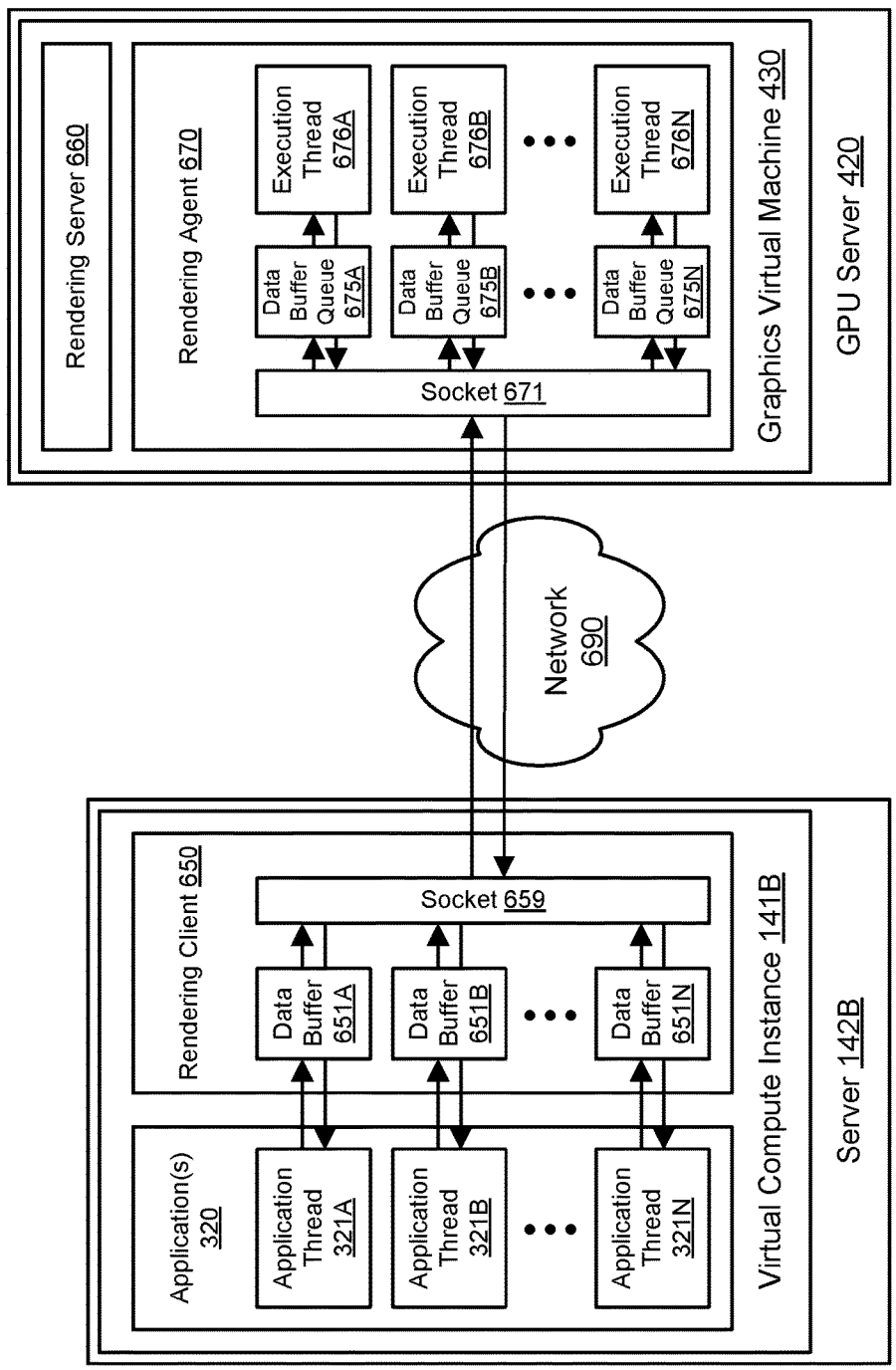
FIG. 6A and FIG. 6B illustrate an example system environment for multithreaded rendering for virtualized graphics processing, according to one embodiment.
Figure 6B:
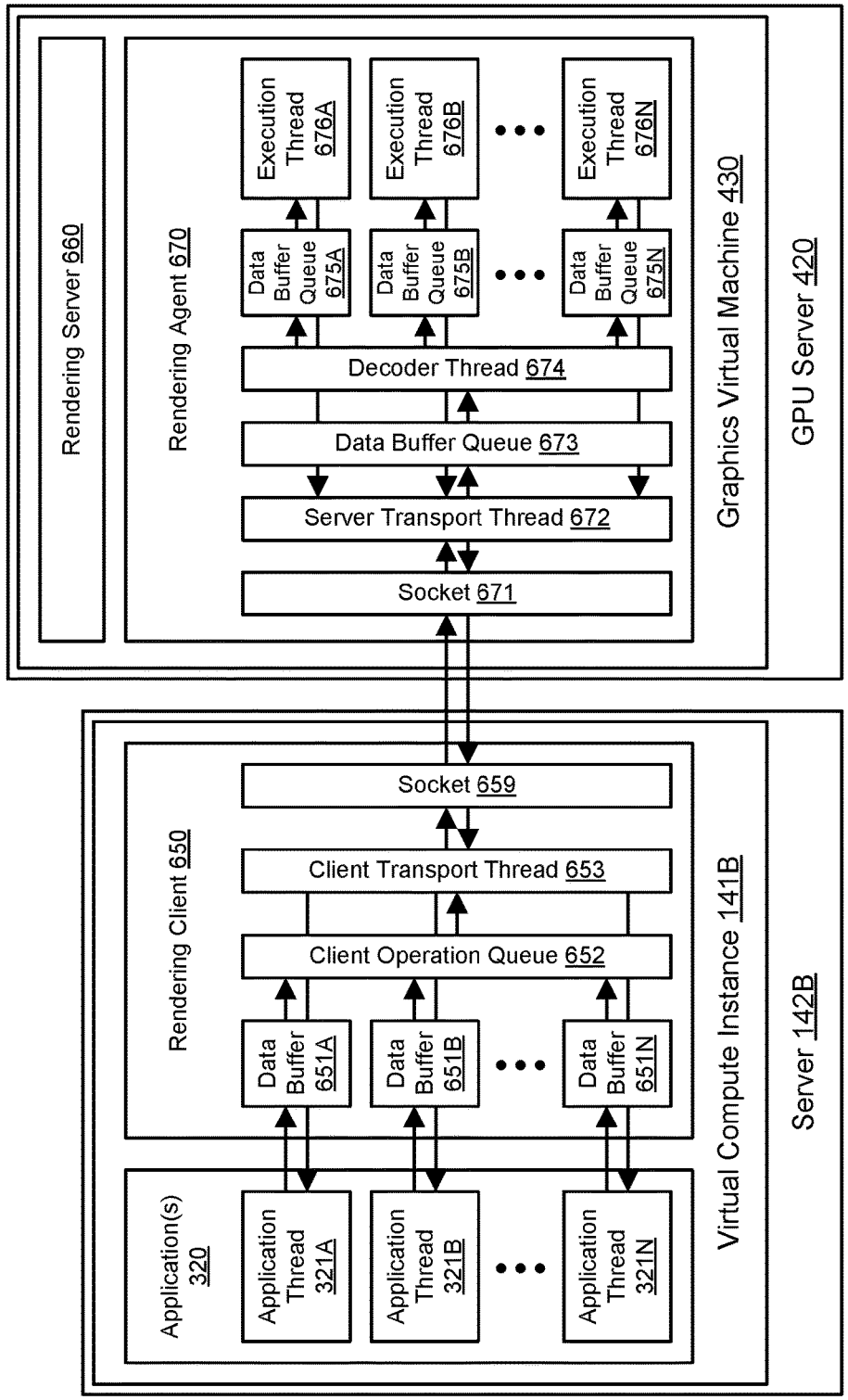

FIG. 6A and FIG. 6B illustrate an example system environment for multithreaded rendering for virtualized graphics processing, according to one embodiment. As discussed above with respect to FIG. 1 through FIG. 5, a virtual compute instance 141B implemented on top of a server 142B may be provisioned with an attached virtual GPU 151B. The virtual GPU 151B may be included in a GPU server 420 that implements a graphics virtual machine 430. The server 142B and the GPU server 420 may communicate via a network 690. After the virtual compute instance 141B is provisioned with the attached virtual GPU 151B, the client device 180A may use the provisioned instance and virtual GPU to perform any suitable tasks, e.g., based on input from the client device. For example, the virtual compute instance 141B may execute one or more applications such as application(s) 320. The application(s) 320 may be selected or provided by the client. The virtual compute instance 141B may also be configured with a particular operating system 322 that provides support for the application(s) 320. The application(s) 320 may include a plurality of application threads 321A-321N that are executed in parallel. Using multithreaded rendering, execution threads 676A-676N may execute in parallel on the GPU server 420, and the execution threads 676A-676N may correspond to application threads 321A-321N on the application host. For example, execution thread 676A may correspond to application thread 321A, execution thread 676B may correspond to application thread 321B, and execution thread 676N may correspond to application thread 321N. Execution of threads in parallel may include maintaining aspects of the threads in memory simultaneously and using one or more processors or processor cores for simultaneous or concurrent execution of instructions associated with the threads. Execution of threads in parallel may include concurrent execution using one processor, e.g., using techniques for task switching to create the appearance of parallel execution.

Additionally, the virtual compute instance 141B may be configured with one or more graphics libraries. A graphics library may include a set of graphics functions, calls, or commands that can be invoked by other software components on the virtual compute instance 141B, such as one or more processes of the application(s) 320. A graphics library may offer a graphics application programming interface (API), and a graphics library may sometimes be referred to as a graphics API. The virtual compute instance 141B may include graphics library. The term "graphics library" may include any set of functions, calls, or commands that are ultimately executed or implemented using a GPU, even if one or more of the functions, calls, or commands do not involve generating displayable output. The graphics library may represent any suitable family of functionality. For example, graphics library may represent a version of Direct3D, such as Direct3D 9, Direct3D 10, Direct3D 11, and so on. As another example, graphics library may represent a version of OpenGL or Vulkan. In some embodiments, the graphics library may include a general-purpose GPU (GPGPU) computing library such as CUDA and/or OpenCL.

The GPU server 420 that includes the virtual GPU 151B may include a driver associated with the same graphics library or a different graphics library. If the graphics libraries on the virtual GPU 151B and GPU server 420 differ, then translation of commands may be implemented to ensure compatibility. The local graphics library may be specific to a particular platform (e.g., to a particular operating system family) associated with the virtual compute instance 141B, and the remote graphics library associated with the virtual GPU may represent a cross-platform graphics library that is available on a variety of computing platforms (e.g., on different families of operating systems and/or different families of computing hardware). The set of functions offered by the local graphics library may differ (at least in part) from the set of functions offered by the remote graphics library of the GPU server 420. However, many of the functions in the local graphics library may have equivalent functions in the remote graphics library of the GPU server 420. If the graphics libraries differ in this manner, then on the virtual compute instance, an intermediate driver may translate calls associated with the local graphics library (such as Direct3D or OpenGL) to the equivalent calls associated with a different graphics library (such as the cross-platform Vulkan library) implemented by the GPU server. Equivalent functions or equivalent calls may represent functions or calls that typically produce the same or similar results even though the form of the call may differ. The equivalent calls may be sent over a network from the server 142B to the GPU server 420 for execution on the attached virtual GPU using the driver associated with the remote graphics library. Converting Direct3D or OpenGL calls to Vulkan commands may reduce the round-trip delays and serialization overhead between the two hosts. If the graphics libraries on the virtual GPU 151B and GPU server 420 do not differ, then calls to the graphics library may be passed directly to a rendering client 650 associated with that library without undergoing translation from one library to another.

In one embodiment, one or more native graphics libraries on the virtual compute instance may be replaced with alternative versions in a process referred to as interposition. The native libraries may be supplied by a vendor of the physical GPU. When one of the applications 320 attempts to load a native graphics library, a library interposition functionality may interpose an alternative version instead of the native version to permit graphics library virtualization. In various embodiments, the library interposition may be performed using various techniques. Using a first technique, a custom version of the display driver may be implemented and installed instead of the display driver supplied by the hardware vendor. Using a second technique, a filter driver may be installed that makes the application process load the alternative version of the library instead of the native one, e.g., during a LoadLibrary call made by the application. The names of the native library and the alternative library may be switched. Using a third technique, the application process may be injected with an external library (e.g., a dynamic link library) which detours the graphics library's calls by changing the import address table (IAT) of the process. The choice of interposition technique may vary according to the use case, e.g., based on the architecture of the library that will be interposed. For example, for Direct3D, injection of an external library or direct installation of a custom display driver may be superior to using a filter driver. As another example, when coexistence with the hardware vendor driver is desired, and the library API is small (as in a user-mode display driver), the injection technique may be used. As yet another example, when the library API is large (like OpenGL), the filter driver may be used.

The graphics library may represent a runtime API. The runtime API may provide a standard interface to use the GPU without requiring an application 320 to have knowledge of the hardware being used and the underlying command buffer system. A runtime API may keep track of the current state, validate parameters, perform error and consistency checking, manage user-visible resources, and/or validate shader code and shader linkage. On Windows, a graphics acceleration runtime API may be represented by a dynamic library which lies in the user space. For example, OpenGL may expose the opengl32.dll library that also represents the Installable Client Driver (ICD) that sends graphics commands directly to the kernel display driver through the D3DKMT API exposed by GDI32. As another example, Direct3D may be represented by a set of libraries (d3d9.dll, d3d10.dll, d3d11.dll, dxgi.dll) where the draw calls are translated into a series of graphics commands for an intermediate driver that is called the user-mode display driver (UMD).

The native UMD for Direct3D may represent a dynamic library which is distributed by the GPU vendor (e.g., nvd3dum.dll by NVIDIA or atiumd*.dll by AMD). The UMD may run in the same context and address space of the API runtime and may have no elevated privileges. The UMD may implement a lower-level API, the device driver interface (DDI), which is similar to the 3D API but more explicit about synchronization and memory management. The UMD may provide per-process command buffers that are vendor-dependent and may contain the actual commands given to the GPU. The shaders may be compiled in runtime, and the driver may inject custom code to implement specific functionality that does not translate directly to hardware. When the command buffer is validated for the GPU, it may be submitted to a kernel-mode display driver (KMD).

The one or more applications 320 may include a plurality of application threads 321A-321N that execute in parallel. For example, a single application 320 may include the multiple application threads 321A-321N. As another example, the application threads 321A-321N may belong to multiple applications 320. In one embodiment, an application thread may call the graphics library, e.g., to render all or part of a 2D or 3D scene. The called library may, for example, implement the Direct3D or OpenGL API. In one embodiment, the calls may be intercepted by a client library on the application host and provided to a rendering client 650. On the compute instance, the rendering client 650 may be configured to collect and send commands to the GPU server 420. The rendering client 650 may also be referred to as a command streamer. The rendering client 650 may serialize the translated calls and send them over the network to the GPU server 420. In one embodiment, a single network connection (e.g., TCP connection) may be used for sending the commands and data associated with the calls. As shown in the example of FIG. 6A and FIG. 6B, the single connection may use a socket 659 on the client side and a corresponding socket 671 on the server side. In one embodiment, multiple network connections (e.g., TCP connections) may be used for sending the commands and data, e.g., using one connection per application thread. The use of multiple network connections for commands and data may prevent one application thread from obstructing other threads by clogging a single connection with a large quantity of data. In this manner, the various application threads may generate and send commands (e.g., graphics commands) to the GPU server over the network for execution using the virtual GPU.

FIG. 6B illustrates additional details of the rendering client 650 and rendering agent 670, according to one embodiment. On the graphics virtual machine 430, a rendering server process 660 may listen to a particular port to establish a network connection (e.g., TCP connection) with a client. The rendering server 660 may also be referred to as a graphics appliance server. When the first graphics command is called, a client transport thread 653 may try to connect to the rendering server 660. Upon receiving a connection request, the rendering server 660 may start a rendering agent process 670. The rendering server 660 may pass the TCP socket ID to the rendering agent 670 for later use for command streaming. When the connection is ready, the graphics commands can be collected by the client library on the application host and pushed into data buffers 651A-651N, e.g., with one data buffer per application thread. The contents of the data buffers 651A-651N may be further sent to a client operation queue 652. When a data buffer reaches a maximum size (e.g., 2 MB) or the command stream must be flushed, the rendering client 650 may send the data buffer to the rendering agent 670. The commands and data in the buffer may be sent by the rendering client 650 to the rendering agent process 670, where the commands can be unpacked, deserialized, and executed.

The data buffer sent to the rendering agent 670 may be received using socket 671, provided to server transport thread 672, and placed in a data buffer queue 673 that can be accessed by a decoder thread 674. In the buffer that is sent to the rendering agent 670 (or other component of the GPU server 420), a command (and its data) may be associated with a thread identifier for the application thread that is associated with the command. After receipt by the rendering agent 670 (or other component of the GPU server 420), a command (and its data) may be assigned to an execution thread that corresponds to the application thread based (at least in part) on the thread identifier. In one embodiment, a command may be added to a queue that is accessible by the appropriate execution thread. For example, each execution thread may have its own command queue or data buffer queue. As shown in the example of FIG. 6B, the queue 675A may be accessible by execution thread 676A, the queue 675B may be accessible by execution thread 676B, and the queue 675N may be accessible by execution thread 676N. The execution threads may execute in parallel on the GPU server 420, and the commands managed by the various execution threads may be executed on the virtual GPU to generate output. In one embodiment, each application thread, each command (and its data) generated by that application thread, and the execution thread corresponding to the application thread may be associated with the same thread identifier. If the execution thread corresponding to an application thread already exists (e.g., based on inspection of the thread identifier), then a command associated with that application thread may be assigned to that execution thread without the need to launch a new execution thread. If an execution thread corresponding to a thread identifier does not exist, then such a thread may be launched by the rendering agent 670, e.g., on receipt of the first command sent by a corresponding application thread.

An execution thread may mirror the activity of the corresponding application thread during the execution of commands. For example, execution thread 676A may mirror the activity of application thread 321A, execution thread 676B may mirror the activity of application thread 321B, and execution thread 676N may mirror the activity of application thread 321N. The data buffers sent by the application(s) 320 may be pushed into a generic data buffer queue 673 on the GPU server 420 and then to thread-specific buffers 675A-675N. When a data buffer is acquired by an execution thread, its commands can be unpacked, deserialized, and executed in the context of the appropriate execution thread. As the data buffers are processed by different execution threads that run in parallel, the graphics command execution may reproduce the same parallelism of the application(s) 320.

In one embodiment, the queue that holds commands for a particular execution thread is accessible by two threads (the decoder thread 674 that adds the commands and the execution thread that reads them) and may be protected by a lock such as a mutex. A semaphore on the queue can be used to understand where an action is required by the execution thread. When a new data buffer is inserted into the queue, the semaphore may be incremented by the decoder thread 674, or else, when the data buffer is dequeued by the execution thread, the semaphore may be decremented. When the queue is empty, no action is required, and the execution thread may stay blocked to that semaphore until it is incremented by the decoder thread 674 when a new data buffer has been pushed to the queue.

In some embodiments, different execution threads may be associated with different graphics libraries, and the multithreaded rendering may enable interoperability of the different graphics libraries on the same compute instance 141B and also on the graphics virtual machine 430. For example, one execution thread associated with OpenGL may run in parallel with another execution thread associated with OpenCL. The execution threads may be closed in a manner dependent on the graphics library that is virtualized. For example, using OpenGL, only one rendering context may be current to one thread at once. When the execution thread does not have a current context, it cannot execute graphics commands or store internal states, and it may be closed. In one embodiment, the execution thread may be closed when glXMakeCurrent(dpy, drawable, NULL) is called. A new execution thread may be launched if another context will be made current on it. In this manner, the accumulation of execution threads may be avoided for those application threads that are closed by the application 320.

Operating in parallel, the various execution threads of the rendering agent 670 may communicate with the display driver on the GPU server 420 to execute the calls, e.g., to render all or part of scene to a frame buffer bound to the application window. The resulting output may be captured in a copyback block and sent back over the network to an image composition component on the virtual compute instance 141B. The image composition component may draw the image in a window associated with the corresponding application 320. Alternatively, the output of executing the calls on the virtual GPU may be provided to another external component such as the client device 180A. For a GPGPU implementation, the rendering client 650 and rendering agent 670 may be referred to as a compute client and compute agent, and the compute client and compute agent may serve similar roles as the rendering client and rendering agent. The rendering server 660 may close the rendering agent process 670 if the corresponding application 320 has been terminated or the connection is lost.

On the GPU server 420, to share the GPU among different processes, a mechanism may be used to ensure not only that the commands are executed in order but also that the GPU can be used by the processes and that no data corruption is introduced during the scheduling. These operations may be implemented by a device driver executing in kernel mode (KMD), where the scheduler and the main command buffer are used to talk to the GPU. A kernel driver scheduler may read commands (and associated data) from each individual per-thread buffer and move them to direct memory access (DMA) buffers. A GPU may include a DMA controller and a memory management unit (MMU). The DMA buffer may allow the GPU to talk directly to host RAM to fetch and write data without CPU intervention. The MMU may virtualize GPU memory and host memory and offers some memory protection. The DMA buffers may be put into the main command buffer, which may be a ring buffer (first-in, first-out) that is filled by the CPU and read by the GPU until it is drained. If the ring is empty (e.g., if write and read pointers are equal), then the GPU may stall and wait until has something to do. If the CPU fills the entire buffer, it may be required to wait for the GPU to finish and create free space in the buffer.

Figure 7:
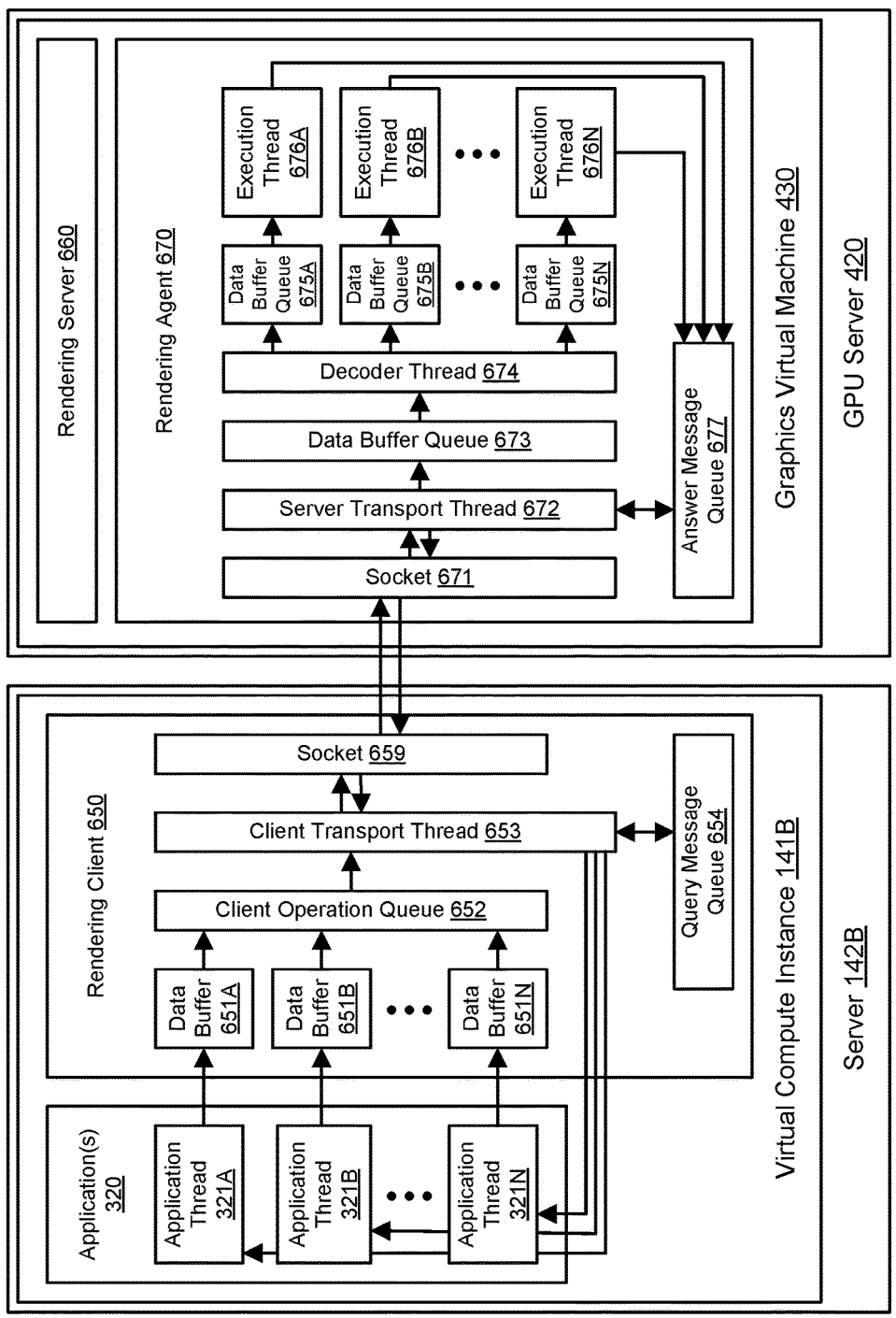
FIG. 7 illustrates further aspects of the example system environment for multithreaded rendering for virtualized graphics processing, including the use of query messages for blocking calls, according to one embodiment.

FIG. 7 illustrates further aspects of the example system environment for multithreaded rendering for virtualized graphics processing, including the use of query messages for blocking calls, according to one embodiment. The multithreaded rendering techniques discussed above may be used to implement parallelism for asynchronous calls. In some embodiments, the multithreaded rendering techniques discussed above may also be used to implement parallelism for synchronous calls. In one embodiment, an application thread may issue a blocking call (also referred to as a synchronous call). The thread may block (with no further execution) until a response is received from the rendering agent (or other component of the GPU server) to indicate that the application thread may resume execution. In one embodiment, one or more query messages may be sent by the rendering client (or other component of the application host) to the rendering agent (or other component of the GPU server) to inquire as to the status of the blocking call. In one embodiment, query messages may be collected in a query message queue 654.

The query messages may be sent with increasing intervals of time, e.g., using an exponential backoff technique, until a response is received or until a timeout threshold occurs. When the execution of the blocking call is completed, the result may be pushed into an answer message queue 677. When a query message arrives for that blocking call, the queue 677 may be checked to see if the result has been already pushed. If the result is not ready, a NULL response may be sent back to the application thread, and the application thread may stay blocked on that function and may continue to send query messages until the proper response is received. If the result is ready in the queue 677, then the corresponding execution thread may generate a response that indicates that the application thread may resume. The response may be sent from the rendering agent to the rendering client, and on receipt of the response, the application thread may be unlocked and may resume execution. By using query messages in this manner, other application threads may be allowed to execute and send commands to the virtual GPU while one thread is blocked rather than effectively blocking or impacting performance for the entire application and client library by allowing one thread to occupy the TCP socket.

In one embodiment, when a blocking call is serialized, the data buffer can be flushed, binding it into a new opcode, inserting all the information that will be used to create a query message from the opcode, and pushing it into the opcode queue. For example, opcodes for blocking calls that return values may include GET_ONE_FIXED (e.g., the data buffer is sent and will wait until it receives a fixed vector of values that are produced by the agent when the buffer is received, deserialized, and the last command executed, in order to execute blocking calls that need to get values when the size of the vector is known on the client and the data copied on the fly to the array passed externally by the application) and GET_ONE_VARIABLE (e.g., the data buffer is sent and will wait until it receives a variable vector of values that are produced by the agent when the buffer is received, deserialized, and the last command executed, in order to execute blocking calls that need to get values when the size of the vector can be known only on the rendering agent). Opcodes may also include FLUSH for non-blocking calls (e.g., the data buffer is sent to the rendering agent, writing directly on the TCP socket, and no answer is required from the rendering agent) and SYNC (e.g., the data buffer is sent to the rendering agent, it will wait until it receives a sync acknowledgement produced immediately by the agent when the buffer is received), and FINISH or SWAP (e.g., the data buffer is sent and will wait for an acknowledgement that is produced by the agent when the buffer is received, deserialized, and the last command executed, in order to implement blocking calls that do not need to get a value as result). After the data buffer is flushed to the rendering agent, the application thread can wait for the semaphore used by the opcode. When the client transport processes this particular kind of opcode, it may immediately send the data buffer to the rendering agent. After that, it may create a new query message with the thread identifier, the semaphore where the application thread is blocked, and all the pointers where the data will be written when an answer is received from the rendering agent. If a non-NULL result is received from the rendering agent, then the data can be copied into the array using the pointer contained into the message, the semaphore can be signaled to unlock the application thread, and the message can be removed from the query message queue 654.

In one embodiment, the number of round-trips generated for the queries may be reduced by collecting the results and updating them when any kind of acknowledgement arrives from the agent. Query messages may not necessarily be sent or answered for every blocking call. For example, results of multiple blocking calls from multiple application threads may be collected in the answer message queue 677 by the rendering agent. When the rendering agent responds to one query message, the rendering agent may send a response for that blocking call and also for other blocking calls that have completed execution, as indicated in the query message queue 677. The responses may be packed into a buffer and then unpacked on the client side for the appropriate application threads.

Figure 8:
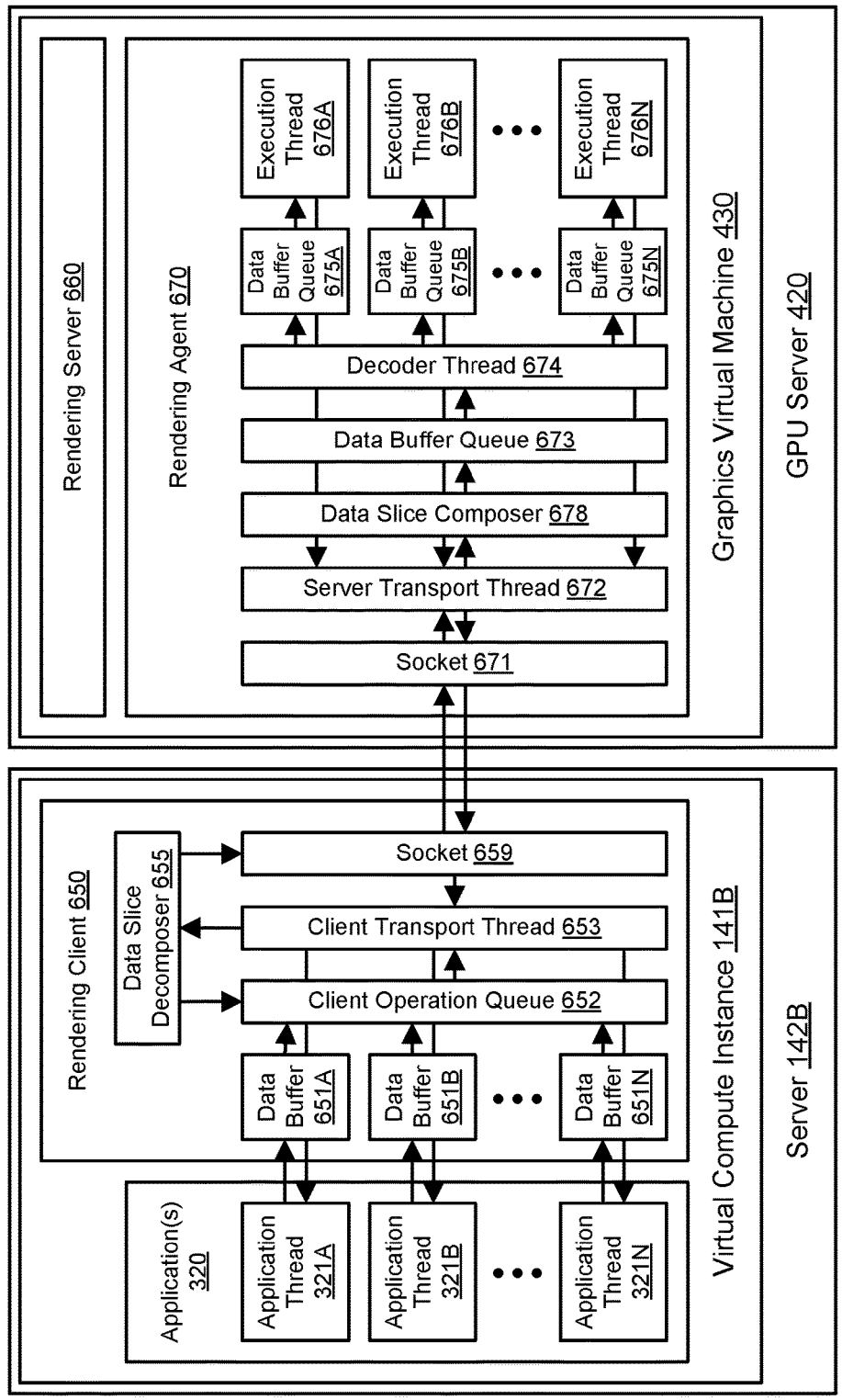
FIG. 8 illustrates further aspects of the example system environment for multithreaded rendering for virtualized graphics processing, including the use of multiple data slices, according to one embodiment.

FIG. 8 illustrates further aspects of the example system environment for multithreaded rendering for virtualized graphics processing, including the use of multiple data slices, according to one embodiment. In one embodiment, the time interval for the query messages could increase the time required to execute a function. For example, if the blocking call is slow enough to require a query every T ms, then a portion of T may be wasted. Moreover, if the TCP channel is busy with a large amount of data, then the query message may be received with a delay that could increase the time required to get the result. In one embodiment, to address these potential problems, data buffers may be divided or decomposed into multiple data slices that can be recomposed on the rendering agent. In one embodiment, the data buffers sent by the client transport can pass through a data slice decomposer 655. If the data buffer is less than N MB, it can be sent as is. Otherwise, no more than N MB may be sent, and the remaining portion of data buffer may be inserted again into the client operation queue 652 to be processed in the next round. On the rendering agent, the data slice may not be pushed into the data buffer queue but instead stored in a temporary slot, such as the data slice composer 678, until the next pieces will be collected and recomposed to build the original data buffer. When the data buffer is reconstructed by, it can be pushed in the data buffer queue 673. If required, an acknowledgement may be sent only when the data buffer is complete and can be pushed into the queue. Using this technique, multiple data slices from multiple threads may be sent without occupying the whole channel for one buffer at a time. Additionally, the query messages may take less time to be sent and received.

Figure 9:
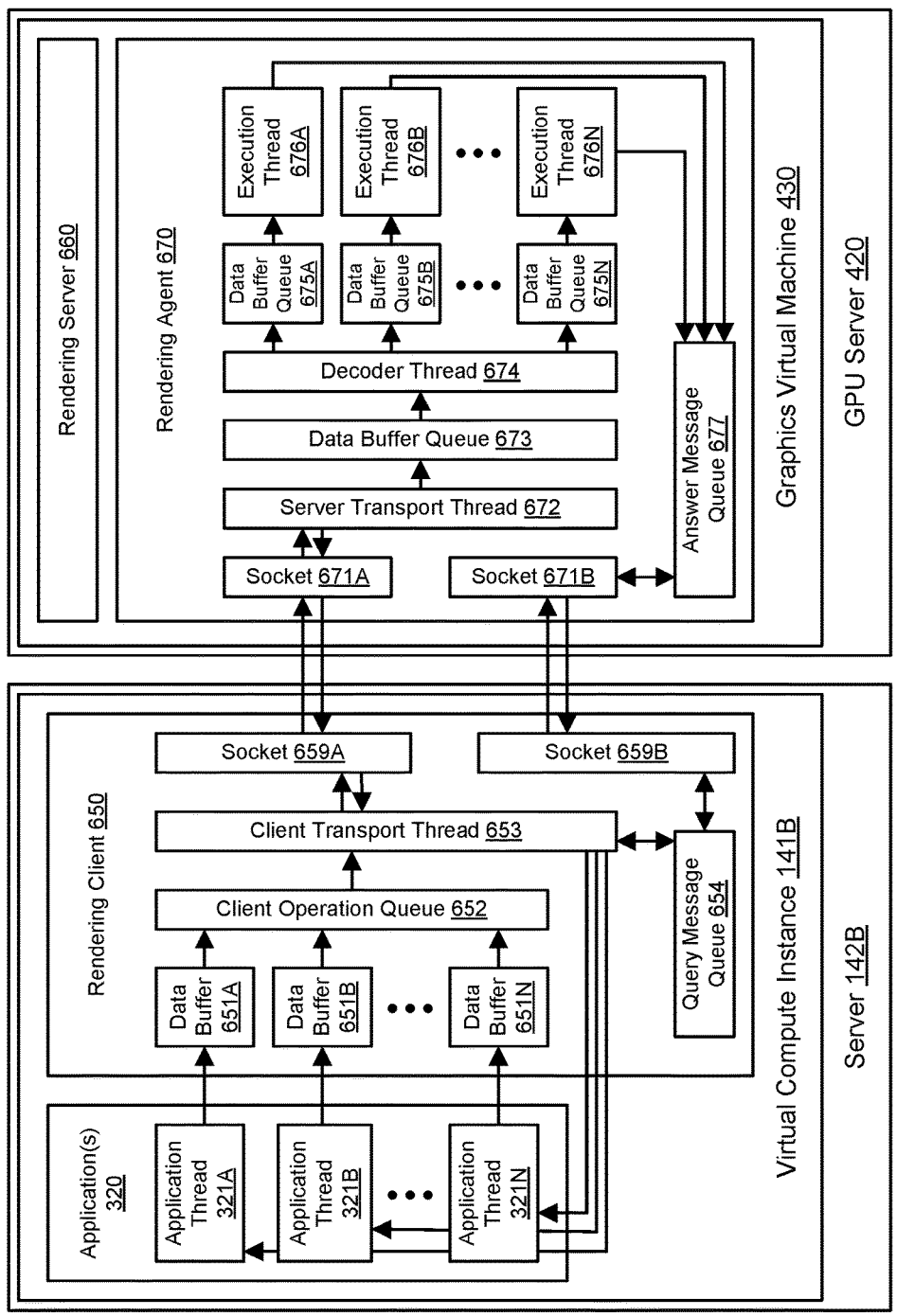
FIG. 9 illustrates further aspects of the example system environment for multithreaded rendering for virtualized graphics processing, including the use of a separate network connection for query messages, according to one embodiment.

FIG. 9 illustrates further aspects of the example system environment for multithreaded rendering for virtualized graphics processing, including the use of a separate network connection for query messages, according to one embodiment. In one embodiment, performance may suffer if a sufficiently large amount of data buffers and query messages occupy a single TCP connection over a period of time. To mitigate this potential problem, in one embodiment, a different network connection (e.g., TCP connection) may be used for the query messages and responses than for the commands and data. In one embodiment, the network connection used for data buffers may also be used for synchronization acknowledgements. As shown in the example of FIG. 9, one connection including sockets 659A and 671A may be used to send data buffers (potentially decomposed into data slices) and acknowledgements, and another connection including sockets 659B and 671B may be used to send query messages and answers to query messages. Using a dedicated TCP connection for query messages, the query messages may be sent more frequently because the round-trips do not necessarily slow down the command stream. To establish the second connection, the client may try a second connection on the same port as the first, after the first has been established. In this case, the rendering server may receive a second attempt that can be considered as associated with the rendering agent, e.g., if a special flag is passed during the handshake. After the second connection, the rendering server may launch a new rendering agent, passing the two socket identifiers to it.

Figure 10:
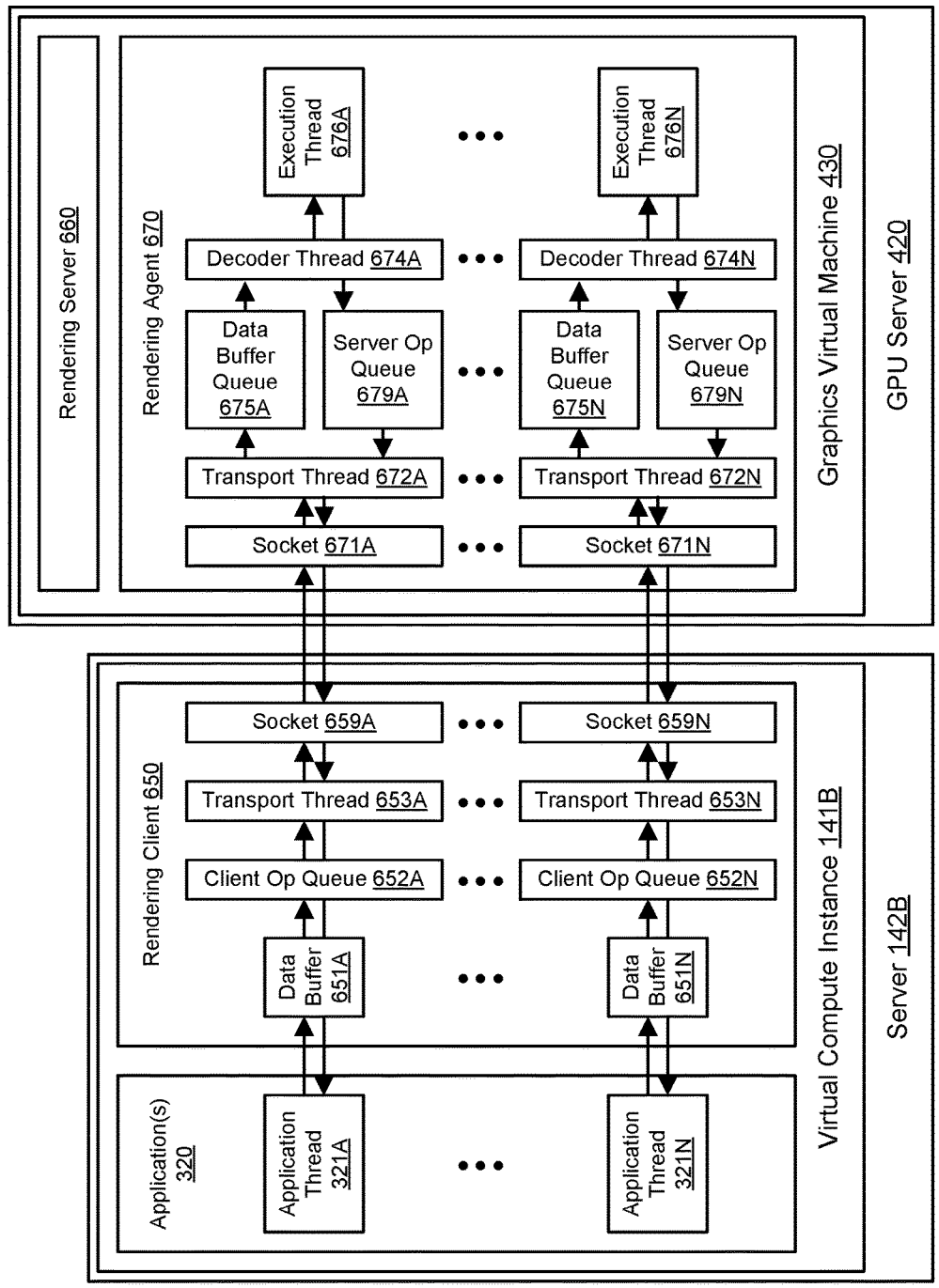
FIG. 10 illustrates further aspects of the example system environment for multithreaded rendering for virtualized graphics processing, including the use of multiple network connections for commands and data, according to one embodiment.

FIG. 10 illustrates further aspects of the example system environment for multithreaded rendering for virtualized graphics processing, including the use of multiple network connections for commands and data, according to one embodiment. In one embodiment, multiple network connections (e.g., TCP connections) may be used for sending the commands and data. Native TCP multiplexing on the same port may be used to implement the dedicated network connections. To have an arbitrary number of network connections, the rendering server may act as an intermediate process that is listening on a particular port. In one embodiment, one dedicated network connection may be opened for each application thread that seeks to send commands to the virtual GPU. In one embodiment, one dedicated network connection of multiple connections may be shared by multiple application threads that seek to send commands to the virtual GPU. The creation of each network connection may be associated with overhead such as the creation of the TCP connection, the client transport thread, the server transport thread, and the decode thread, potentially for each application thread that requires a dedicated connection. As shown in the example of FIG. 10, one application thread 321A may be associated with a dedicated data buffer 651A, client op queue 652A, client transport thread 653A, client-side socket 659A, server-side socket 671A, server transport thread 672A, data buffer queue 675A, server op queue 679A, and execution thread 674A, while another application thread 321N may be associated with a dedicated data buffer 651N, client op queue 652N, client transport thread 653N, client-side socket 659N, server-side socket 671N, server transport thread 672N, data buffer queue 675N, server op queue 679N, and execution thread 674N. In one embodiment, to mitigate such overhead, the use of multiple network connections for commands and data may be disabled or reduced if the application host includes a sufficiently large number of application threads.

In one embodiment, instead of initializing a single client transport only when the first function is called and the client library initialized, the initialization can be performed when the first graphics command is serialized, e.g., for every thread. In one embodiment, a pointer to the transport object used for serialization can be stored into the transport layer security (TLS). When this object is used for the serialization, it can be checked to see if the pointer is NULL or not. If the pointer is not NULL, it means that a client transport (and the TCP connection) has been already initialized and can be used for the serialization, or else a new client transport may be initialized for that thread. In this case, the client transport handler can try to connect to the port where the rendering server is listening.

When the rendering server receives a new client connection, it can read a series of information that is transmitted during the handshake, including the client identifier of the application that required the connection. If the handshake is successful, the rendering server may check if the client identifier has been already pushed into an internal list. If not, it means that the process is calling a graphics function for the first time and a new rendering agent process should be launched. After that, a communication pipe may be opened between the rendering server and the rendering agent. If the client identifier is on the list, the rendering server may proceed to the next step. The client identifier may be used to get the communication pipe where the rendering agent is listening. The socket identifier of the TCP connection may be sent to the rendering agent using that communication pipe. When the message arrives at the agent, the server transport handler may use the socket identifier to initialize a new server transport thread and decode thread associated with the application thread. On the client side, a new client transport thread may be initialized using the TCP socket. The new client transport object may be sent to the TLS, and the check can be repeated again. If the transport object is then found, it can be used to serialize the graphics commands. The TCP connections can be closed when no context is current the application thread, e.g., when a glXMakeCurrent(dpy, drawable, NULL) is executed on the decode thread. A termination handshake may close the TCP connection, and the client/server threads may be terminated.

Using the full TCP multiplexing for parallel command execution may provide improved performance with several acknowledgements and data buffers sent in parallel. However, the same approach may impact performance due to the time required to perform the initialization and the termination handshakes, especially when the TCP connections are frequently opened and closed. In one embodiment, to mitigate this potential problem, a TCP connection may be closed when no context is current for a sufficiently long amount of time.

In some embodiments, different network connections may be employed in parallel for different graphics libraries present on the application host. For example, the application host may concurrently offer, to applications, the varying functionality associated with OpenGL, OpenCL, Vulkan, and so on. Each graphics library may have at least one dedicated TCP connection between the application host and the GPU server. In one embodiment, a graphics library may have multiple TCP connections, e.g., one connection for data buffers and another connection for query messages and answers, or one connection per application thread. In one embodiment, data buffers for one graphics library may be decomposed into data slices, while data buffers for another graphics library may not. TCP multiplexing on a library-by-library basis may enable library-specific management of command streams and other data sent between the application host and the GPU server.

Figure 11:
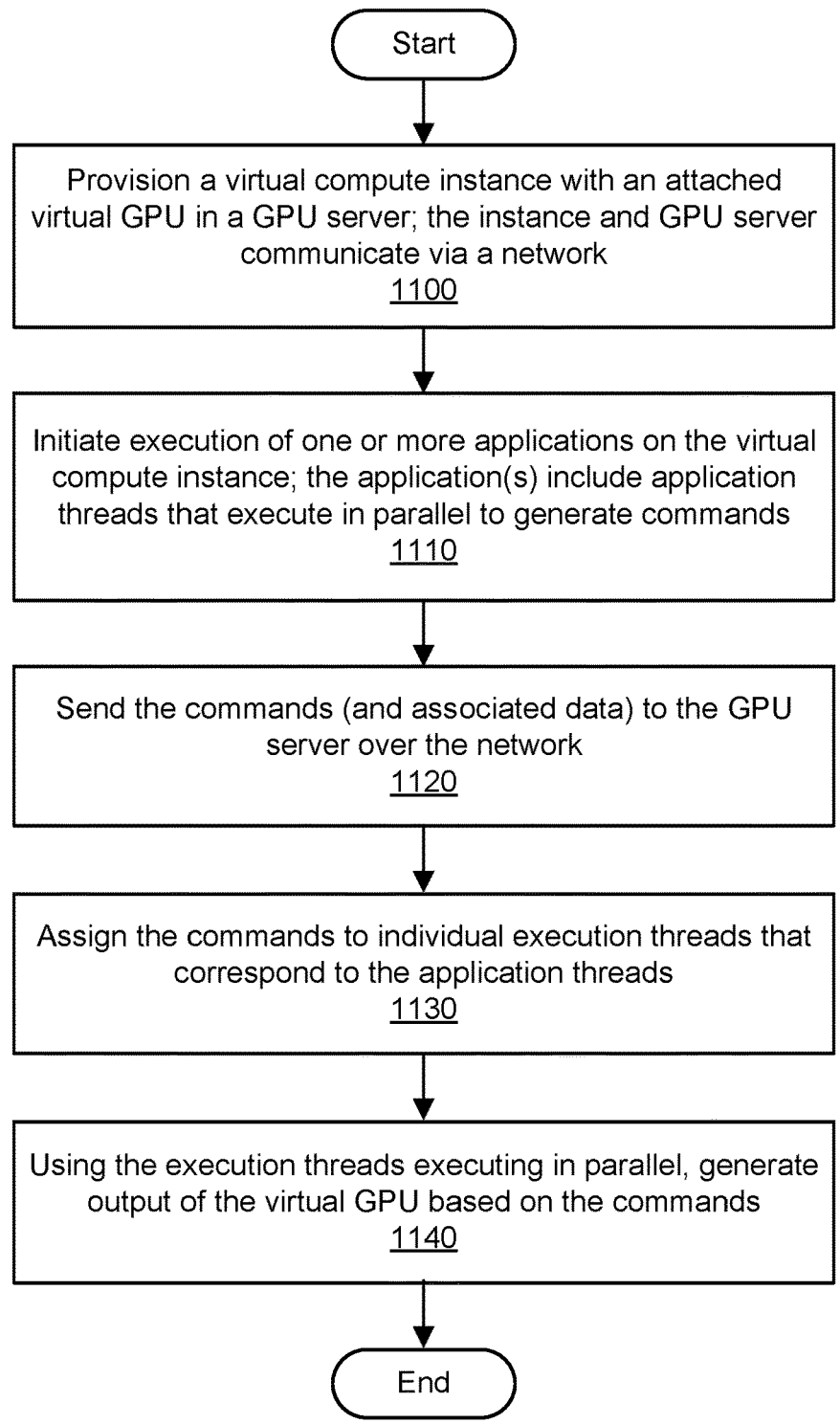
FIG. 11 is a flowchart illustrating a method for multithreaded rendering for virtualized graphics processing, according to one embodiment.

FIG. 11 is a flowchart illustrating a method for multithreaded rendering for virtualized graphics processing, according to one embodiment. As shown in 1100, a virtual compute instance may be provisioned with an attached virtual GPU. The virtual compute instance may be selected based (at least in part) on computational and memory resources provided by the virtual compute instance. For example, the virtual compute instance may be selected based (at least in part) on a selection of an instance type by a client. The virtual GPU may be selected based (at least in part) on graphics processing capabilities provided by the virtual GPU. For example, the virtual GPU may be selected based (at least in part) on a selection of a virtual GPU class by a client. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU. The elastic graphics service may interact with one or more other services or functionalities of a provider network, such as a compute virtualization functionality and/or GPU virtualization functionality, to provision the instance with the virtual GPU.

The virtual compute instance may be implemented using central processing unit (CPU) resources and memory resources of a server, also referred to as a physical compute instance. The virtual GPU may be implemented using a physical GPU in a GPU server. The physical GPU may be attached to or included in a different computing device (e.g., the GPU server) than the computing device that provides the CPU resources for the virtual compute instance. The physical GPU may be accessible to the server over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 1110, execution of one or more applications may be initiated on the virtual compute instance. The one or more applications may include a plurality of application threads that execute in parallel. In one embodiment, an application thread may call a graphics library, e.g., to render all or part of a 2D or 3D scene. A graphics library may include a set of graphics functions, calls, or commands that can be invoked by other software components on the virtual compute instance, such as an application. A graphics library may offer a graphics application programming interface (API), and the first graphics library may sometimes be referred to as a graphics API. By calling the graphics library, the various application threads may generate and send commands (e.g., graphics commands) to the GPU server over the network for execution using the virtual GPU. At least some of the commands may be associated with data, e.g., as input to a particular command.

As shown in 1120, the commands and their associated data may be sent from the virtual compute instance to the GPU server. When the virtual compute instance collects and sends commands and associated data to the GPU server, a packet with a command and/or data may be associated with a thread identifier for the application thread that generated the command. In one embodiment, one buffer sent to the GPU server may include such packets as generated by (or on behalf of) multiple application threads. In one embodiment, the commands and data may be sent over a single network connection that is shared by multiple application threads. In one embodiment, the commands and data may be sent over multiple network connections, e.g., one connection per application thread.

Instead of executing the commands using a single thread on the GPU server, the GPU server may launch a plurality of execution threads that execute in parallel. In one embodiment, the execution threads may correspond to the application threads, e.g., with a one-to-one correspondence. As shown in 1130, the commands and their associated data may be assigned to individual execution threads on the GPU server. Upon receipt by the GPU server, a command (and its data) may be assigned to an execution thread that corresponds to the application thread based (at least in part) on the thread identifier. An execution thread may be launched on receipt of the first command sent by a corresponding application thread. In one embodiment, assigning a command to an appropriate execution thread may include adding the command to a queue that is accessible by that execution thread and not necessarily by other execution threads.

As shown in 1140, the virtual GPU may generate output based on execution of the commands and the associated data. For example, the virtual GPU may render all or part of a 2D or 3D scene or may perform GPGPU computation. At least some of the commands may be executed in parallel using the parallel execution threads. Execution of threads in parallel may include maintaining aspects of the threads in memory simultaneously and using one or more processing elements for simultaneous or concurrent execution of instructions associated with the threads. Execution of threads in parallel may include concurrent execution using one processor, e.g., using techniques for task switching to create the appearance of parallel execution. Using these techniques, parallelism on the application host may be maintained on the GPU server that implements the virtual GPU.

Illustrative Computer System

In at least some embodiments, a computer system that implements a portion or all of one or more of the technologies described herein may include a computer system that includes or is configured to access one or more computer-readable media. FIG. 12 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
 a virtual compute instance, wherein the virtual compute instance is implemented using one or more processors and a memory of a server, wherein the virtual compute instance executes a plurality of application threads in parallel, wherein a plurality of commands are generated by execution of the application threads, wherein at least some of the commands are associated with data representing input, and wherein individual ones of the commands are associated with identifiers of individual ones of the application threads; and
 a virtual graphics processing unit (GPU) attached to the virtual compute instance, wherein the virtual GPU is implemented using a physical GPU of a GPU server, and wherein the server and the GPU server are communicatively coupled via a network;

wherein the GPU server is executable to:
  receive the commands from the virtual compute instance via the network;
  add the commands to a plurality of queues associated with a plurality of execution threads, wherein individual ones of the execution threads correspond to individual ones of the application threads, and wherein the commands are added to the queues based at least in part on the identifiers; and
  generate GPU output using the commands based at least in part on parallel execution of the execution threads.

2. The system as recited in claim 1, wherein the application threads comprise a first application thread, and wherein the GPU server is further executable to:
  determine that one or more of the commands received from the virtual compute instance are associated with an identifier of the first application thread;
  determine that an execution thread corresponding to the first application thread is not executing on the GPU server; and
  launch a first execution thread corresponding to the first application thread, wherein the one or more of the commands associated with the identifier of the first application thread are assigned to the first execution thread.

3. The system as recited in claim 1, wherein the application threads comprise a first application thread, wherein the commands comprise a blocking call generated by the first application thread, and wherein the GPU server is further executable to:
  receive, from the virtual compute instance, one or more query messages associated with the blocking call; and
  send, to the virtual compute instance, a response to the one or more query messages based at least in part on completed execution of the blocking call, wherein the first application thread resumes execution based at least in part on receipt of the response.

4. The system as recited in claim 3, wherein the commands are received via a first network connection between the virtual compute instance and the GPU server, and wherein the one or more query messages are received via a second network connection between the virtual compute instance and the GPU server.

5. A computer-implemented method, comprising:
  receiving a plurality of commands from a computing device at a graphics processing unit (GPU) server via a network, wherein a virtual GPU is implemented using a physical GPU of the GPU server and attached to the computing device, wherein the commands are generated by a plurality of application threads executing in parallel and associated with a single virtual compute instance on the computing device, and wherein individual ones of the commands are associated with identifiers of individual ones of the application threads;
  assigning individual ones of the commands to individual ones of a plurality of execution threads on the GPU server, wherein the individual ones of the execution threads correspond to the individual ones of the application threads, and wherein the commands are assigned based at least in part on the identifiers; and
  generating GPU output using the commands based at least in part on parallel execution of at least some of the execution threads.

6. The method as recited in claim 5, wherein the application threads comprise a first application thread, and wherein the method further comprises:
  determining that one or more of the commands received from the computing device are associated with an identifier of the first application thread;
  determining that an execution thread corresponding to the first application thread is not executing on the GPU server; and
  launching, on the GPU server, a first execution thread corresponding to the first application thread, wherein the one or more of the commands associated with the identifier of the first application thread are assigned to the first execution thread.

7. The method as recited in claim 5, further comprising:
  adding the commands to a plurality of queues associated with the plurality of execution threads, wherein commands are added to the queues based at least in part on the identifiers.

8. The method as recited in claim 5, wherein the application threads comprise a first application thread, wherein the commands comprise a blocking call generated by the first application thread, and wherein the method further comprises:
  receiving, at the GPU server from the computing device, one or more query messages associated with the blocking call; and
  sending, from the GPU server to the computing device, a response to the one or more query messages based at least in part on completed execution of the blocking call, wherein the first application thread resumes execution based at least in part on receipt of the response.

9. The method as recited in claim 8, wherein the commands are received via a first network connection between the computing device and the GPU server, and wherein the one or more query messages are received via a second network connection between the computing device and the GPU server.

10. The method as recited in claim 5, wherein the application threads comprise a first application thread and a second application thread, wherein the commands comprise a first blocking call generated by the first application thread and a second blocking call generated by the second application thread, and wherein the method further comprises:
  completing execution of the first blocking call and the second blocking call using the GPU server;
  sending, from the GPU server to the computing device, a buffer comprising an indication that the first blocking call has completed execution and an indication that the second blocking call has completed execution.

11. The method as recited in claim 5, wherein the commands are received via a plurality of network connections between the computing device and the GPU server.

12. The method as recited in claim 5, wherein the GPU server is provided by a multi-tenant provider network, wherein the computing device implements a virtual compute instance in the multi-tenant provider network, and wherein the application threads are executed by the virtual compute instance.

13. A non-transitory computer-readable storage medium storing program instructions computer-executable to perform:
  receiving a plurality of commands from a compute instance at a graphics processing unit (GPU) server via a network, wherein a virtual GPU is implemented using a physical GPU of the GPU server and attached to the compute instance, wherein the commands are generated by a plurality of application threads executing in parallel and associated with a single virtual compute instance on the compute instance, and wherein individual ones of the commands are associated with identifiers of individual ones of the application threads;

assigning individual ones of the commands to individual ones of a plurality of execution threads on the GPU server, wherein the individual ones of the execution threads correspond to the individual ones of the application threads, and wherein the commands are assigned based at least in part on the identifiers; and generating GPU output based at least in part on parallel execution of the commands using the execution threads.

14. The non-transitory computer-readable storage medium as recited in claim 13, wherein the application threads comprise a first application thread, and wherein the program instructions are further computer-executable to perform:

determining that one or more of the commands received from the compute instance are associated with an identifier of the first application thread;

determining that an execution thread corresponding to the first application thread is not executing on the GPU server; and launching, on the GPU server, a first execution thread corresponding to the first application thread, wherein the one or more of the commands associated with the identifier of the first application thread are assigned to the first execution thread.

15. The non-transitory computer-readable storage medium as recited in claim 13, wherein the program instructions are further computer-executable to perform:

adding the commands to a plurality of queues associated with the plurality of execution threads, wherein commands are added to the queues based at least in part on the identifiers.

16. The non-transitory computer-readable storage medium as recited in claim 13, wherein the application threads comprise a first application thread, wherein the commands comprise a blocking call generated by the first application thread, and wherein the program instructions are further computer-executable to perform:

receiving, at the GPU server from the compute instance, one or more query messages associated with the blocking call; and sending, from the GPU server to the compute instance, a response to the one or more query messages based at least in part on completed execution of the blocking call, wherein the first application thread resumes execution based at least in part on receipt of the response.

17. The non-transitory computer-readable storage medium as recited in claim 16, wherein the commands are received via a first network connection between the compute instance and the GPU server, and wherein the one or more query messages are received via a second network connection between the compute instance and the GPU server.

18. The non-transitory computer-readable storage medium as recited in claim 13, wherein the application threads comprise a first application thread and a second application thread, wherein the commands comprise a first blocking call generated by the first application thread and a second blocking call generated by the second application thread, and wherein the program instructions are further computer-executable to perform:

completing execution of the first blocking call and the second blocking call using the GPU server;

sending, from the GPU server to the compute instance, a buffer comprising an indication that the first blocking call has completed execution and an indication that the second blocking call has completed execution.

19. The non-transitory computer-readable storage medium as recited in claim 13, wherein the commands are received via a plurality of network connections between the compute instance and the GPU server.

20. The non-transitory computer-readable storage medium as recited in claim 13, wherein at least some of the commands are associated with data representing input, wherein the commands and data are received in a plurality of data slices, and wherein the data slices are divided based at least in part on a size of the commands and the data.

* * * * *